(12) United States Patent
Elliott et al.

(10) Patent No.: US 8,978,322 B2
(45) Date of Patent: *Mar. 17, 2015

(54) SOLAR PANEL

(75) Inventors: Stuart Elliott, Park Orchards (AU); Samuel Ross Garland Lanyon, Elwood (AU); Eduardo Vom, Brunswick East (AU); Richard Allman, Wyndham Vale (AU)

(73) Assignee: Empire Technology Development LLC, Wilmington, DE (US)

( * ) Notice: Subject to any disclaimer, the term of this patent is extended or adjusted under 35 U.S.C. 154(b) by 81 days.

This patent is subject to a terminal disclaimer.

(21) Appl. No.: 12/886,370

(22) Filed: Sep. 20, 2010

(65) Prior Publication Data

US 2011/0203639 A1 Aug. 25, 2011

(51) Int. Cl.
*E04D 13/18* (2014.01)
*H01L 31/048* (2014.01)
*F24J 2/52* (2006.01)

(52) U.S. Cl.
CPC ........... *H01L 31/0482* (2013.01); *F24J 2/5235* (2013.01); *Y02B 10/12* (2013.01); *Y02E 10/47* (2013.01); *Y02E 10/50* (2013.01)
USPC .......................... 52/173.3; 136/245; 136/251

(58) Field of Classification Search
CPC ..... Y02B 10/12; H01L 31/0482; F24J 2/5235
USPC .................. 52/173.3; 136/244, 245, 246, 251
See application file for complete search history.

(56) References Cited

U.S. PATENT DOCUMENTS

| | | | | |
|---|---|---|---|---|
| 4,020,827 A * | 5/1977 | Broberg | | 126/696 |
| 4,296,736 A * | 10/1981 | Soot | | 126/621 |
| 4,371,139 A | 2/1983 | Clark | | |
| 4,410,757 A * | 10/1983 | Stamminger et al. | | 136/248 |
| 5,125,608 A | 6/1992 | McMaster et al. | | |
| 5,228,924 A | 7/1993 | Barker et al. | | |
| 5,505,788 A * | 4/1996 | Dinwoodie | | 136/246 |
| 5,935,343 A * | 8/1999 | Hollick | | 136/246 |
| 6,046,399 A | 4/2000 | Kapner | | |
| 6,063,996 A * | 5/2000 | Takada et al. | | 136/246 |
| 6,065,255 A | 5/2000 | Stern et al. | | |
| 6,420,645 B1* | 7/2002 | Ohtsuka et al. | | 136/251 |
| 6,606,830 B2* | 8/2003 | Nagao et al. | | 52/173.3 |

(Continued)

FOREIGN PATENT DOCUMENTS

CN 101626040 A 1/2010
DE 200088441 7/2000

(Continued)

OTHER PUBLICATIONS

"SolarRoof Membrane", www.solarintegrated.com, Jun. 2, 2009, 2 pages.

(Continued)

*Primary Examiner* — Brent W Herring
(74) *Attorney, Agent, or Firm* — Dorsey & Whitney LLP (57) ABSTRACT

A solar energy collecting panel includes a support substrate and one or more solar energy receiving surface disposed on the support substrate. The panel is mountable to extend in a mounting plane across an underlying structure. The support substrate is configured so that when the panel is mounted to the underlying structure at least a portion of the solar energy receiving surface is at an inclined angle to the mounting plane.

17 Claims, 4 Drawing Sheets

(56) References Cited

U.S. PATENT DOCUMENTS

| | | | |
|---|---|---|---|
| 6,703,555 B2* | 3/2004 | Takabayashi et al. | 136/244 |
| 6,930,238 B2* | 8/2005 | Makita et al. | 136/251 |
| RE38,988 E* | 2/2006 | Dinwoodie | 136/251 |
| 7,435,897 B2 | 10/2008 | Russell | |
| 7,534,699 B2* | 5/2009 | Wong et al. | 438/458 |
| 7,600,349 B2 | 10/2009 | Liebendorfer | |
| 7,655,860 B2* | 2/2010 | Parsons | 136/263 |
| 7,810,286 B2* | 10/2010 | Eiffert et al. | 52/173.3 |
| 7,918,221 B2* | 4/2011 | Warfield et al. | 126/623 |
| 7,921,843 B1* | 4/2011 | Rawlings | 126/623 |
| 8,341,895 B2* | 1/2013 | Schwarze et al. | 52/173.3 |
| 2004/0007260 A1* | 1/2004 | Dinwoodie | 136/251 |
| 2006/0053706 A1 | 3/2006 | Russell | |
| 2006/0086382 A1 | 4/2006 | Plaisted | |
| 2008/0040990 A1 | 2/2008 | Vendig et al. | |
| 2008/0087275 A1* | 4/2008 | Sade et al. | 126/623 |
| 2008/0110492 A1* | 5/2008 | Buller et al. | 136/251 |
| 2008/0128015 A1* | 6/2008 | Shugar et al. | 136/246 |
| 2008/0190047 A1* | 8/2008 | Allen | 52/173.3 |
| 2008/0223429 A1* | 9/2008 | Everett et al. | 136/244 |
| 2009/0113822 A1* | 5/2009 | Patrina et al. | 52/173.3 |
| 2009/0205270 A1* | 8/2009 | Shaw et al. | 52/173.3 |
| 2009/0282755 A1 | 11/2009 | Abbott et al. | |
| 2009/0308430 A1* | 12/2009 | Everett et al. | 136/246 |
| 2010/0000165 A1* | 1/2010 | Koller | 52/173.3 |
| 2010/0077679 A1 | 4/2010 | Sagayama | |
| 2010/0218805 A1* | 9/2010 | Everett et al. | 136/246 |
| 2010/0243023 A1* | 9/2010 | Patton et al. | 136/244 |
| 2011/0146753 A1* | 6/2011 | Johnson et al. | 136/246 |
| 2011/0253193 A1* | 10/2011 | Korman et al. | 136/245 |
| 2012/0096781 A1* | 4/2012 | Romesburg | 52/173.3 |

FOREIGN PATENT DOCUMENTS

| | | | | |
|---|---|---|---|---|
| JP | 2000064523 A | * | 2/2000 | E04D 13/00 |
| JP | 2002303455 A | | 10/2002 | |
| JP | 2007035928 A | | 2/2007 | |
| WO | WO 94/00650 | | 1/1994 | |
| WO | 2004083741 A2 | | 9/2004 | |
| WO | 2007076519 A2 | | 7/2007 | |
| WO | 2010045129 A2 | | 4/2010 | |
| WO | WO 2011/094786 | | 8/2011 | |

OTHER PUBLICATIONS

"Asian/European Double Layer Product", www.solarintegrated.com, Jun. 2, 2009, 1 page.

"North American Double Layer Product" www.solarintegrated.com, Jun. 2, 2009, 1 page.

"Solar Metal Roofing", www.solarintegrated.com, Jun. 2, 2009, 1 page.

Author Unknown, "Open Structure Solutions: The Perfect Addition to Any Structure," http://www.unirac.com/mounting-solutions/open-structure.php, copyright 2009, 1 page.

Endecon Engineering with Regional Economic Research, Inc., "A Guide to Photovoltaic (PV) System Design and Installation," California Energy Commission, Jun. 14, 2001, Version 1.0, 40 pages.

Peterson, M., "Re: wind load calculations'?," accessed at http://web.archive.org/web/20090423091919/http://www.amsat.org/amsat/archive/amsat-bb/200105/msg00815.html, May 15, 2001, 2 pages.

International Search Report for International Application No. PCT/AU2010/000728 mailed on Jul. 30, 2010.

* cited by examiner

SOLAR PANEL

CROSS-REFERENCE

This application claims priority to Australian application No. 2010200699, filed Feb. 25, 2010, currently pending, entitled "SOLAR PANEL," which is hereby incorporated by reference in its entirety.

TECHNICAL FIELD

This disclosure relates generally to solar energy collecting panels and methods of mounting such panels. While the disclosure is directed to photovoltaic (PV) panels for use in mounting to residential and commercial roofs, the disclosure is not limited to such installations, and may be in respect of other types of solar collectors (such as solar thermal collectors) or for mounting on other substrates, such as the ground.

BACKGROUND

PV panels typically include an array of electrically coupled PV cells. One inhibiting factor for the uptake of PV panels in residential power generation applications is the relatively higher cost compared with the cost of power provided by utility companies. A high portion of the overall cost is installation cost, which typically accounts for more than about 20% of the overall cost. Furthermore, where PV panels need to be inclined with respect to an underlying structure to improve incidence to the sun (e.g. when installed on a flat roof), mounting systems required in such applications can represent about 10-15% of the overall cost of the system.

SUMMARY

In one embodiment, a solar energy collecting panel includes a support substrate and one or more solar energy receiving surfaces disposed on the support substrate. The panel is mountable to extend in a mounting plane across an underlying structure. The support substrate is configured so that when the panel is mounted to the underlying structure at least a portion of the solar energy receiving surface is at an inclined angle to the mounting plane.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION OF ILLUSTRATIVE EMBODIMENTS

In the following detailed description, reference is made to the accompanying drawings, which form a part thereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is directed generally to solar collectors (also known as "solar panels" or "solar energy collecting panels") and in an example form, photovoltaic (PV) panels. While the disclosure is described generally in the context of solar panels for residential and commercial roofs, the panels are not limited to such installations, and may be used for mounting on other substrates, such as on walls and on the ground.

PV panels typically include an array of electrically coupled PV cells. Common PV cells are made from monocrystalline cells, or polycrystalline cells. Monocrystalline cells include wafer-based cells of crystalline silicon, which are cut from a cylinder of a single silicon crystal. Polycrystalline cells are cut from ingots of molten and recrystallised silicon. Polycrystalline cells are cheaper to manufacture than monocrystalline cells, yet less efficient. Another increasingly common type of PV cell is the thin-film PV cell (TFPVC). TFPVCs are made by deposition of a photovoltaic material, such as amorphous silicon, on an appropriate substrate, such as glass, plastic or metal. TFPVCs tend to be cheaper yet less efficient that monocrystalline or polycrystalline based PV cells.

Currently, solar cell sizes are limited as a function of manufacturing restrictions and cost per $mm^2$. PV cells tend to be square, to improve packing in an array, with dimensions ranging from approximately 100 mm×100 mm to approximately 150 mm×150 mm. There currently is no industry standard for the dimensions of a PV cell, or the number of cells in an array forming a PV panel. However, for commercial power generation systems, typical PV panel dimensions are approximately 650 mm×1500 mm, or 900 mm×1800 mm, depending on the PV cell size and the manufacturer. For example, a PV panel may comprise a 6×9 array of PV cells. To form a PV panel, PV cells are mounted to a substrate, typically inflexible, such as glass, and also covered by glass to protect the cells. The resulting panels are heavy. Moreover, given the large size of typical PV panels, mounting systems tend to be heavy and complex to assemble.

Disclosed in some embodiments is a solar energy collecting panel that includes a support substrate and one or more solar energy receiving surfaces disposed on the support substrate. The panel is mountable to extend in a mounting plane across an underlying structure. In one form, the support substrate may be configured so that when the panel is mounted to the underlying structure at least a portion of the solar energy receiving surface is at an inclined angle to the mounting plane.

Also disclosed in some embodiments is a solar energy collecting panel that includes multiple discrete solar receiving surfaces on a support substrate. In one form, the discrete solar receiving surfaces are electrically coupled.

Disclosed in some embodiments is a solar energy collecting panel having a support substrate that includes at least one projecting formation that extends from a reference plane of the support substrate. In one form, at least one portion of at least one solar energy receiving surface disposed on the support substrate is disposed on a part of the projecting formation that extends transverse to the reference plane. In some embodiments, the panel is mountable to extend in a mounting plane across an underlying structure and the support substrate is configured so that when mounted to the underlying structure, the reference plane generally aligns with, or is parallel to, the mounting plane.

Disclosed in some embodiments is a solar collecting panel having a support substrate that includes multiple projecting formations, and multiple discrete solar receiving surfaces are disposed on respective portions of the projecting formations. In one form, the solar receiving surfaces are inclined to form an array of spaced apart solar receiving surfaces. In some embodiments, the spaced apart solar receiving surfaces in the array face generally in the same direction.

Disclosed in some embodiments is a solar energy collecting panel having a support substrate that is formed from sheet material. In some embodiments, the sheet material is profiled to include multiple projecting formations which extend linearly between opposite ends of the sheet, the projecting formations being spaced apart and the substrate includes pan sections disposed between the adjacent projecting formations. In one form the projecting formations are in the form of ribs having opposite walls and at least one solar energy receiving surface is disposed on one of the walls of a respective rib. In one form, the support substrate is corrugated and includes alternate peaks and troughs and at least one solar energy receiving surface is disposed on a portion of the sheet intermediate a respective one of the peaks and troughs. In one form, the support substrate includes a base portion which extends in the reference plane and at least one projecting formation extends from the base portion.

Disclosed in some embodiments is a solar energy collecting panel having at least one solar energy receiving surface with an aspect ratio of length to height of greater than 10:1. In one form, the aspect ratio is greater than 20:1.

Also disclosed in some embodiments is a cladding panel for a building including a solar energy collecting panel having a support substrate that is formed from a profiled sheet. In one form, one or more solar energy receiving surface is disposed on the support substrate formed from the profiled sheet.

Also disclosed in some embodiments is a method for mounting a solar energy collecting panel to an underlying structure, the method including mounting a support substrate of the panel to the underlying structure so that the panel extends in a mounting plane across the underlying structure, whereby when mounted on the underlying structure, at least one solar energy receiving surface disposed on the support substrate is at an inclined angle to the mounting plane.

Figure 1:
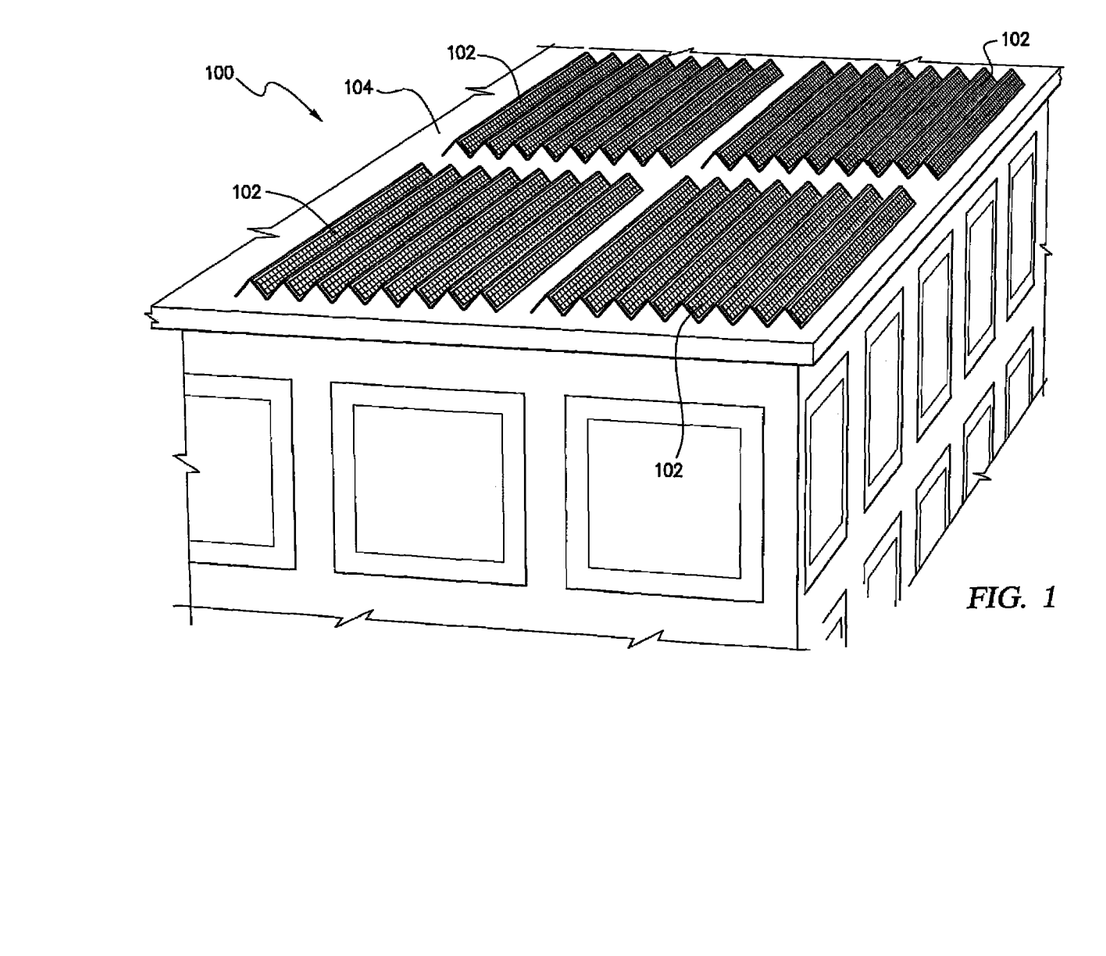
FIG. 1 shows a schematic of a building with an illustrative embodiment of an array of PV panels mounted on its roof.

As illustrated in the Figures, some illustrative embodiments of solar collecting panels, such as PV panels, are able to be installed with solar receiving surfaces of the panels at an inclined angle to a roof or other underlying surface without requiring a complex mounting system. FIG. 1 shows a schematic of a building 100 with an illustrative embodiment of an array of PV panels 102 mounted on a roof 104 of the building 100. The panels 102 may overlay at least portions of the roof 104 (which in the illustrated form is flat) so that the panels 102 extend across the roof 104 in a mounting plane which in the illustrative example is coincident with the roof surface. The panels 102 may be secured in place, using for example, simple fixing systems (not shown) such as self drilling screws. Other fixing systems that may be used to secure the panels 102 in place include welding, adhesive bonding or other mechanical fasteners such as clips, clamps nails, locking systems or the like. The PV panels 102 may be coupled to an inverter and the buildings energy supply system as per standard systems.

Figure 2:
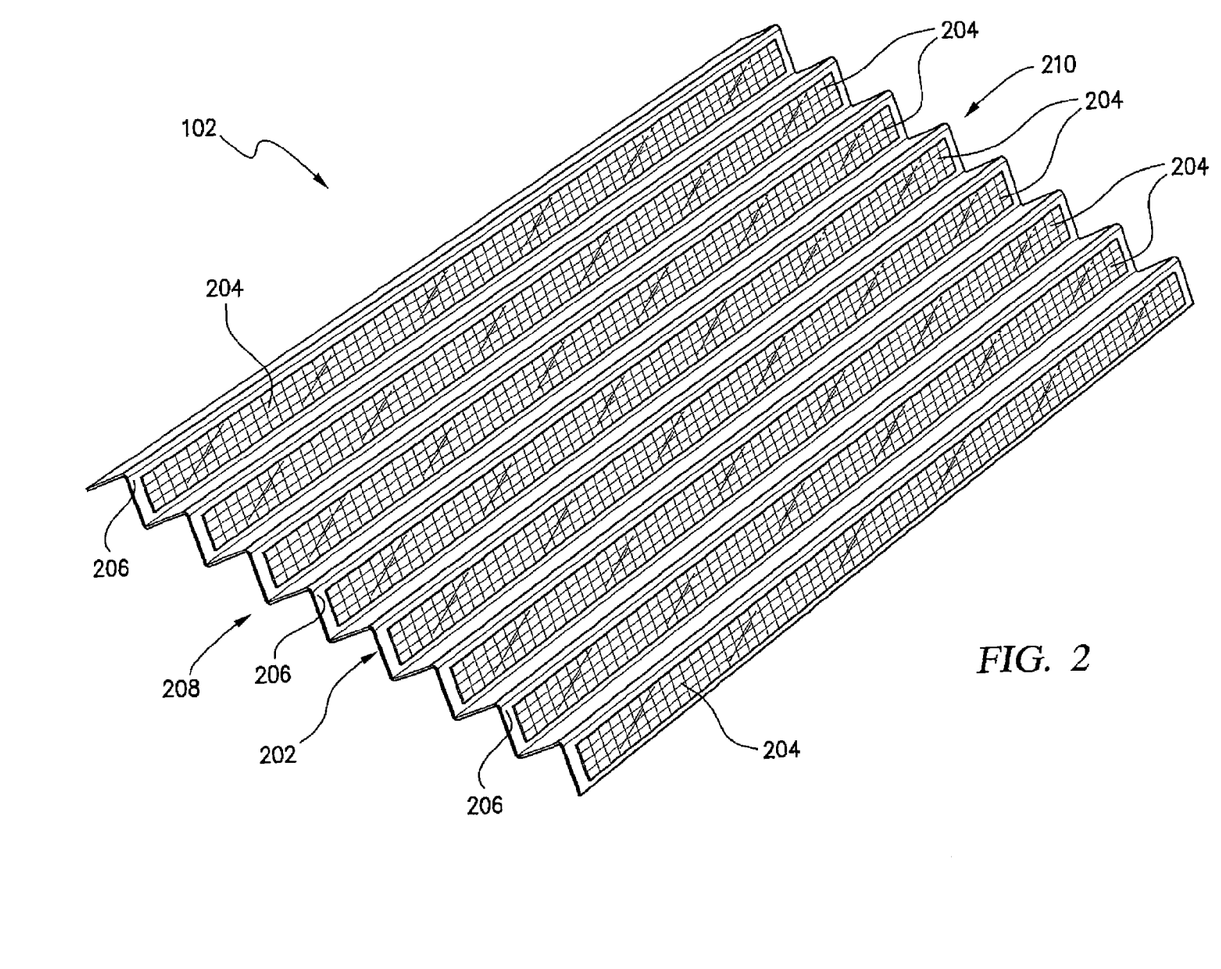
FIG. 2 shows a schematic perspective view of one of the PV panels shown in FIG. 1.

FIG. 2 shows a schematic perspective view of one of the PV panels 102 shown in FIG. 1. The panel 102 includes a support substrate 202 on which is mounted multiple solar energy receiving surfaces, which as depicted are slim line PV strips 204 that may, for example, use standard or thin-film organic PV cells. The substrate 202 may be made from a sheet material, for example sheet metal, polymeric sheeting, such as polycarbonate sheet, fibre or cementitious sheeting including composite fibre sheeting or cementitious based board, or other durable sheet material. In one form, the substrate 202 is made from sheet metal that includes a corrosion resistant alloy coating such as an Al—Zn metal coating and which may include a decorative paint finish. In the form as depicted, the substrate 202 is profiled to include projecting formations 206. The projecting formations 206 are shown in the illustrative embodiment as corrugations. The projecting formations 206 may extend linearly between opposite ends 208, 210 of the substrate 202. Such profiling of the substrate 202 may be formed using for example a pressing, forming or extruding operation. In one form, where the substrate is made from metal, such as from steel strip, the profiling on the substrate may be made by a cold roll forming process where the sheet is profiled in continuous lengths from coils of metal strip. The profiled sheet may then cut to desired length to suit the required length for the PV panel.

Figure 3:
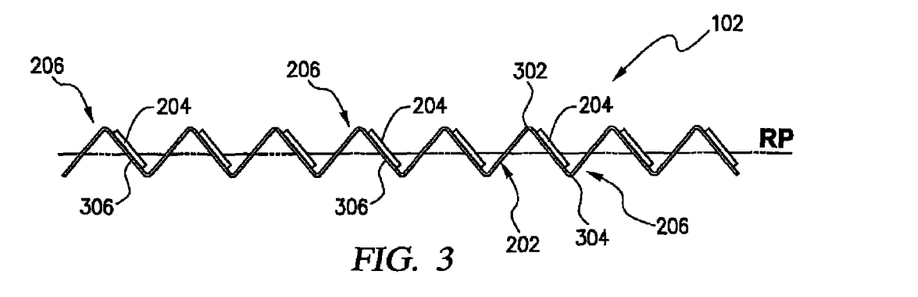
FIG. 3 shows a side elevation of the PV panel of FIG. 2.

FIG. 3 shows a side elevation of the PV panel 102 of FIG. 2. As depicted, the projecting formations 206 of the corrugated substrate 202 project from a reference plane RP of the sheet and include alternate peaks 302 and troughs 304. Furthermore the PV strips 204 are disposed on portions 306 of the substrate 202 intermediate respective ones of the peaks 302 and the troughs 304. These portions 306 are inclined to the reference plane RP so that the PV strips 204 mounted on those portions 306 similarly are at an inclined angle to the reference plane RP.

In the illustrative embodiments, the PV panels 102 may be of relatively low profile. As an example, the height (or total maximum transverse displacement of the substrate 202 from reference plane RP) of the projecting formations 206 may be about 200 mm, whereas the length of the PV panel 102 between opposite ends 208, 210 may be multiple meters, say for example about 3 m or more. One or more of the PV strips 204 that form the solar energy receiving surfaces of the PV panel 102 may extend along the majority of the length of the panel 102 and may be confined to only the portion 306 of one or more projecting formation 206. As such, the height of the PV strips 204 may be small compared to their length and the height of the PV strips 204 may be in the order of 150 mm. Such PV strips 204 may be formed from multiple numbers of approximately 150 mm×150 mm PV cells coupled in series in a single row. The PV cells may be coupled in series or in parallel and may be coupled through a conductive medium that in one form is conductive metal. In one form, the conductive medium may be printed or otherwise deposited onto a substrate of the PV cell or may be included as part of the cell substrate. In one form, the conductive medium may be deposited on, or form part of, the support substrate 202 of the PV panel 102. Having the PV strips 204 in a single row is in contrast to typical PV panels which have a 2-D array of PV cells, such as 6×9 arrays, which are installed in "portrait" orientation. The aspect ratio (being the length relative to the height) of one or more of the PV strips is in one form greater than 10:1. The aspect ratio may be even greater (say 50:1). In one form, the ratio is between 3:1 and 60:1. In one form, the ratio is between 10:1 and 40:1.

In one form, the PV panel 102 includes multiple discrete PV strips 204 as shown, for example, in the illustrative embodiment of FIGS. 2 and 3. Further, these PV strips 204 may be disposed on inclined portions 306 of the substrate 202 so as to improve the solar efficiency of the PV panel 102. If a solar energy receiving surface (say an array of PV cells) in a PV panel is mounted horizontally, then the effective collection area is significantly reduced by the cosine of the angle of the optimal orientation. For example, if the optimal panel orientation for a particular latitude is 45 degrees, then the reduction in performance by mounting the panel horizontally may be about 30% due to the reduced surface area available for solar collection. By mounting the PV strips 204 on the inclined portions 306 of the substrate 202 of the PV panel 102, then the PV panel 102 may not need to be mounted at an inclined orientation onto a flat underlying surface as the solar energy receiving surfaces formed by the PV strips 204 will already be at an inclined angle. This therefore allows for simplified mounting of the PV panels 102. Further, the positioning of the PV strips 204 on the substrate 202 may be arranged as shown in the illustrative embodiments, so that the solar energy receiving surfaces face in the same direction which in use will be directed towards the sun.

Figure 4:
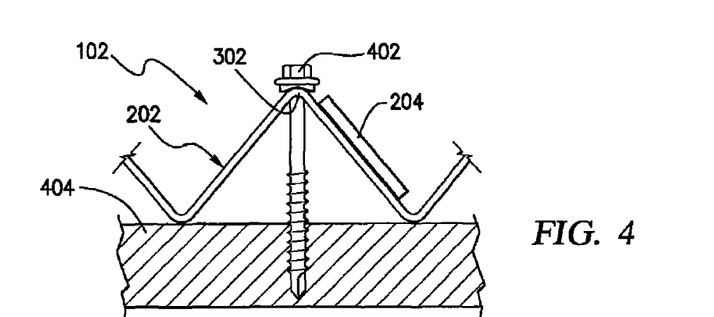
FIG. 4 shows a detailed view of an illustrative embodiment of a fixing between a PV panel and an underlying structure.

FIG. 4 shows a detailed view of an illustrative embodiment of a fixing between the PV panel 102 and an underlying structure. As depicted, the PV panel 102 has a low profile and may be laid flat on an underlying structure while still allowing the solar energy receiving surfaces to be inclined. The low profile of the PV panel 102 results in reduced wind shear on the PV panel 102 and as the panel 102 can be laid flat, the means of fixing the panel 102 can be relatively simple. In the form as illustrated in FIG. 4, the PV panel 102 may be fixed by mechanical fasteners such, for example, self drilling Tek screws 402 which may be fixed through the peaks 302 into an underlying structure 404 as is common in fixing corrugated roof sheeting in place. It will be understood that other fixing techniques may be used such as by welding, or other types of mechanical fasteners such as clips that engage with the panel substrate, or the like.

Figure 5:
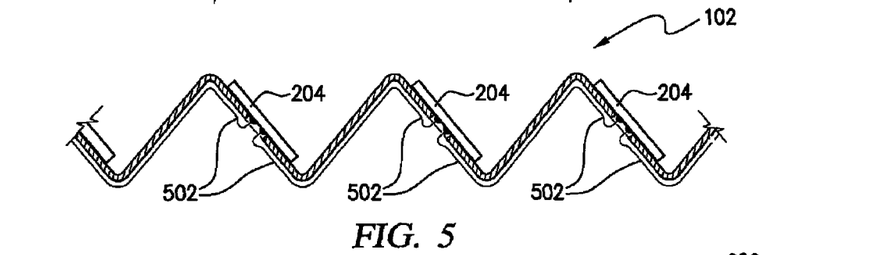
FIG. 5 shows a detailed view of an illustrative embodiment of an electrical coupling of solar energy receiving surfaces in a PV panel.

FIG. 5 shows a detailed view of an illustrative embodiment of an electrical coupling of solar energy receiving surfaces, such as PV strips 204 in a PV panel, such as the PV panel 102. To reduce the complexity of the installation of the panels, the panels 102 may be assembled, for example, in a production line facility, with the discrete PV strips 204 electrically coupled. In the illustrated form, the PV strips 204 may be pre-wired by electrical wiring 502.

Figure 6:
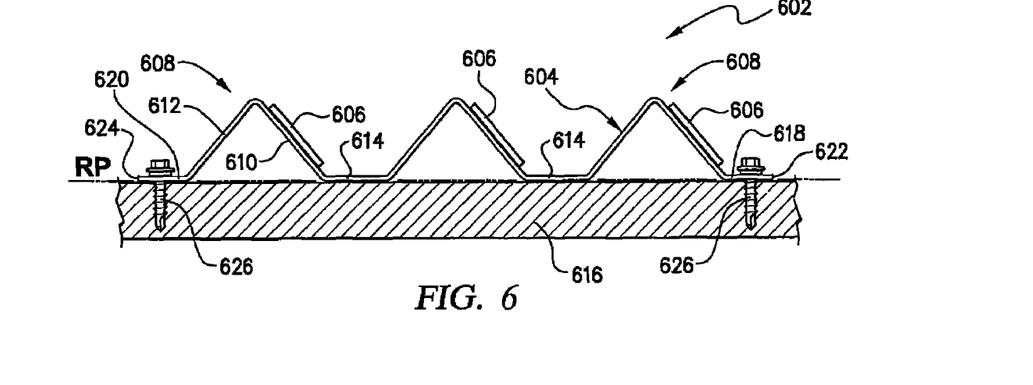
FIG. 6 shows a side elevation of another illustrative embodiment of a PV panel mounted on an underlying structure.

FIG. 6 shows a side elevation of another illustrative embodiment of a PV panel 602 mounted on an underlying structure. As depicted, the PV panel 602 includes a substrate 604 having multiple solar energy receiving surfaces which in the form as depicted are slimline PV strips 606 that may, for example, use standard or thin-film organic PV cells. The substrate 604 may be made from sheet material, for example, a sheet metal, and may include a corrosion resistant alloy coating, such as an Al—Zn metal coating, and may include a decorative paint finish. In the form as depicted, the substrate 604 includes multiple projecting formations in the form of ribs 608 having opposite walls 610, 612. These ribs 608 extend linearly and may extend between opposite ends (not shown) of the substrate 604. The ribs 608 are spaced apart and the substrate 604 includes pan sections 614 disposed between two adjacent ribs 608. The pan sections 614 extend generally in a reference plane RP of the substrate 604. Profiling of the substrate 604 may occur by using, for example, a pressing, a forming or an extruding operation. In one form, where the substrate 604 is made from metal, the substrate 604 may be made by a cold roll forming process where the substrate 604 is profiled in continuous lengths from coils of metal strip. The profiled substrate 604 may then cut to desired lengths to suit the required length of the PV panel 602.

PV strips 606 which form the solar energy receiving surfaces of the PV panel 602, as shown in the illustrative embodiment, may be disposed on only one of the side walls 610 of one or more of the ribs 608. In this way the PV strips 606 may both be inclined to the reference plane RP and also face in the same direction so as to improve incidence to the sun when mounted on a flat underlying surface 616 as depicted in FIG. 6. It is to be understood that the shape of the profiling of the substrate 604 (being in the illustrated embodiment the shape of the ribs 608 and the width of the pan sections 614) may be varied so as to change the height and/or angle of the rib walls 610 on which the PV strips 606 are mounted. Such flexibility in the design of the profiling of the substrate 604 allows for the substrate to be designed to orientate the PV strips 606 at a desired angle to the sun at a given latitude. Thus, different substrate designs may be deployed for different latitudes.

In the form as depicted, the substrate 604 of the PV panel 602 includes edge sections 618, 620 which extend along opposite sides 622, 624 of the PV panel 602. These edge sections 618, 620 extend in the reference plane RP of the PV panel 602 and are configured to receive mechanical fasteners, for example, Tek screws 626, to fix the PV panel 602 to the underlying surface 616.

Figures 7, 8, 9:
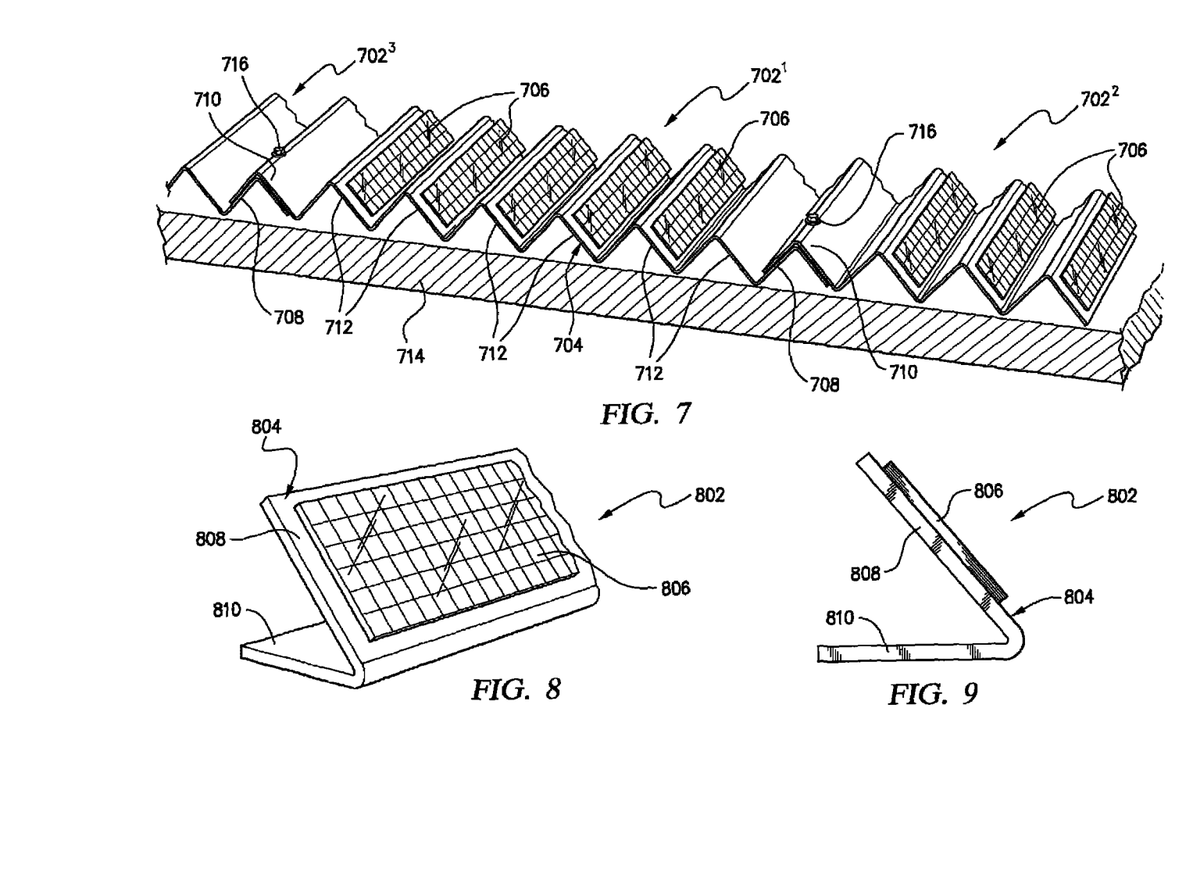
FIG. 7 shows a schematic of an illustrative embodiment of a building cladding formed from PV panels.
FIG. 8 shows a schematic of a further illustrative embodiment of a PV panel.
FIG. 9 shows a side elevation of the PV panel of FIG. 8.

FIG. 7 shows a schematic of an illustrative embodiment of a building cladding formed from PV panels. The PV panels (generally designated 702 but shown in FIG. 7 as $702^1$, $702^2$, and $702^3$ to distinguish between individual panels in the cladding) include a substrate 704 which is made from sheet material which is suitable for use as a cladding. One example is sheet steel which includes a corrosion resistant metal coating but other sheet material claddings may include polymeric sheeting or cement fibre sheeting or the like. The substrate 704 is profiled to include projecting formations, including outer projecting formations 708, 710, and intermediate projecting formations 712. The projecting formations 708, 710 and 712 may serve one or more functions such as, by way of example: —to provide an inclined surface to have mounted thereto solar receiving surfaces, to provide structural integrity, to provide an aesthetic appearance to the panel, or to provide a lapping edge to enable adjacent panels $702^1$, $702^2$, and $702^3$ to be arranged in a lapped configuration. In one arrangement, the solar energy receiving surfaces may be in the form of PV strips 706. In the illustrative embodiments, these strips 706 may be disposed on intermediate ones of the projecting formations 712. The PV panel as shown in the illustrative embodiment may be arranged to have the outer projecting formations 708, 710 arranged to overlap with adjacent panels $702^2$ so as to form a continuous cladding surface. In the illustrated form of FIG. 7, one PV panel $702^1$ is shown in lapping arrangement with two adjacent panels (shown only in partial view) being $702^2$ and $702^3$. With the arrangement as illustrated in FIG. 7, the interlapped PV panels $702^1$, $702^2$, and $702^3$ have the dual function of being a solar energy collector as well as being a cladding for the building. In accordance with known fixing practices for cladding, the panels 702¹, 702², and 702³ may be secured to the underlying structure 710 using standard fixing techniques such as, for example, self-drilling screws 712. Other fixing techniques may include other mechanical fasteners such as concealed clips or the like, or by bonding by for example by adhesive bonding or welding of the panels 702¹, 702², and 702³ to the underlying surface 714.

FIGS. 8 and 9 show a schematic and side elevation, respectively, of a further illustrative embodiment of a PV panel 802. As depicted, the PV panel 802 includes a substrate 804 on which a solar energy receiving surface in the form of a PV strip 806 is mounted. As in the earlier embodiments, the PV strip 806 may, for example, use standard or thin-film organic PV cells. The substrate 804 may be in the form of an angle section, such as, for example, an angled aluminum extrusion that includes a mounting portion 808 and a base portion 810. The PV strip 806 may be mounted on the mounting portion 808 whereas the base portion 810 may be arranged to be mounted directly onto an underlying surface (not shown) such as a flat surface of a roof. When so mounted, the PV strip 808 is inclined at an angle to the underlying surface. In similar arrangement to the earlier illustrative embodiments, the PV panel 802 may be fixed to the underlying surface using any appropriate fastening system (not shown) such as self-drilling Tek screws or other mechanical fastener, or by bonding the panel 802 to the underlying surface or the like.

The PV panels (102, 602, 702, 802) may be installed directly on to a flat surface, for example the underlying surfaces (104, 404, 616, 710). The solar receiving surfaces of the panels, such as the PV strips (204, 606, 706, 806) may be inclined to the underlying surfaces (104, 404, 616, 710) by virtue of the shape of the support substrate (202, 604, 704, 804) of the PV panels (102, 602, 702, 802) on which the solar energy receiving surfaces are disposed. As will be understood, for increased efficiency, the PV panels (102, 602, 702, 802) can be mounted on a portion of the underlying surface (104, 404, 616, 714) and orientated so that the solar receiving surfaces, such as the PV strips (204, 606, 706, 806) face towards the sun—facing towards North in the Southern Hemisphere and towards South in the Northern Hemisphere. The PV panels (102, 602, 702, 802) may be supplied in a single length or sets of lengths as required and in one form may be provided with the individual PV strips (204, 606, 706, 806) forming the solar receiving surfaces being prewired together. Once on site, the PV panels (102, 602, 702, 802) can be laid on the underlying surface (104, 404, 616, 714) and fixed in position, for example using mechanical fasteners, such as self drilling screws (302, 626, 712), or nails, clamps, or locking arrangements, or by other fixing techniques such as welding, adhesive bonding or the like. Once fixed the PV panels (102, 602, 702, 802) may be electrically coupled to an electrical network.

While the above description is generally described in the context of PV panels (102, 602, 702, 802), it will be understood that the disclosure is not limited to PV panels. For example, in alternative arrangements, the solar energy collecting panels may be solar thermal collectors, such as flat plate thermal collectors, or evacuated solar tube arrays.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). Further, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or, "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

It is to be understood that, if any prior art publication is referred to herein, such reference does not constitute an admission that the publication forms a part of the common general knowledge in the art.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods which can, of course, vary. It is also to be understood that the terminology used herein is for the purpose of describing particular embodiments only, and is not intended to be limiting.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed:

1. A panel system for mounting on a roof of a building, the panel system comprising:
    a plurality of support substrates, each of the plurality of support substrates including:
        a single sheet having a corrugated form defining a plurality of projecting formations, the corrugated form comprising a plurality of alternating peaks and pan sections, wherein the pan sections extend in a mounting plane that is substantially parallel to the roof underlying the support substrate, wherein each of the plurality of projecting formations comprises a first intermediate surface between one of the pan sections and one of the peaks and a second intermediate surface between the one of the peaks and another one of the pan sections, wherein the first intermediate surfaces of the plurality of projecting formations are in a fixed position substantially parallel to each other and at an inclined angle with respect to the mounting plane, and wherein the second intermediate surfaces of the plurality of projecting formations are in a fixed position substantially parallel to each other;
    a plurality of fasteners passing through one or more of the pan sections of each of the plurality of support substrates and securing each of the plurality of support substrates to the roof;
    a plurality of photovoltaic panels disposed at the inclined angle with respect to the mounting plane on a plurality of the first intermediate surfaces of the plurality of projecting formations on the single sheet, each of the plurality of photovoltaic panels comprising a plurality of photovoltaic cells, wherein an aspect ratio of a length of a first edge of each of the plurality of photovoltaic panels to a length of a second edge of each of the plurality of photovoltaic panels is greater than 10:1, wherein the support substrate is configured so that at least the second edge of each of the plurality of photovoltaic panels is at the inclined angle to the mounting plane and at least the first edge of each of the plurality of photovoltaic panels is substantially parallel to the mounting plane; and
    wherein:
        each support substrate of the plurality of support substrates includes an outer projecting formation lacking any photovoltaic panels and defining a lapping edge of the support substrate;
        the lapping edges of first and second adjacent support substrates of the plurality of support substrates overlap each other; and
        a peak of the plurality of alternating peaks of the first support substrate is nested under a peak of the plurality of alternating peaks of the second support substrate.

2. The panel system of claim 1, wherein the plurality of photovoltaic panels are electrically coupled to each other.

3. The panel system of claim 1, wherein at least one portion of one of the plurality of photovoltaic panels is disposed on a part of the support substrate that extends transverse to a reference plane.

4. The panel system of claim 1, wherein the support substrate is formed from sheet metal.

5. The panel system of claim 4, wherein the sheet metal includes a corrosion resistant alloy coating.

6. The panel system of claim 1, wherein the plurality of projecting formations extend linearly between opposite ends of the support substrate.

7. The panel system of claim 6, wherein ones of the plurality of projecting formations are in the form of ribs.

8. The panel system of claim 1, wherein the support substrate is corrugated.

9. The panel system of claim 1, wherein the aspect ratio is greater than 20:1.

10. The panel system of claim 1, wherein the troughs are arranged to be laid substantially flat against an underlying structure.

11. The panel system of claim 10, wherein ones of the peaks are configured to receive one or more fasteners that extend from the ones of the peaks to the underlying structure.

12. The panel system of claim 11, wherein the plurality of photovoltaic panels are electrically coupled to each other before the support substrate is fastened to the underlying structure using the one or more fasteners.

13. The panel system of claim 12, wherein the support substrate has a low profile.

14. The panel system of claim 1, wherein the peaks and pan sections of the first and second support substrates continuously alternate on the first and second support substrates.

15. A panel system for mounting on a roof of a building, the panel system comprising:
    a plurality of support substrates, each of the plurality of support substrates including:
        a single sheet having a corrugated form defining a plurality of projecting formations, the corrugated form comprising a plurality of alternating peaks and pan sections, wherein the pan sections extend in a mounting plane that is substantially parallel to the roof underlying the support substrate, each of the plurality of projecting formations comprises a mounting surface at an inclined angle with respect to the mounting plane, wherein the plurality projecting formations comprises first projecting formation having a first mounting surface and a second projecting formation having a second mounting surface, wherein the first mounting surface is located between a first peak and a first pan section, wherein the second mounting surface is located between a second peak and a second pan section, and wherein the pan sections are arranged to be laid substantially flat against the roof of the building;

a plurality of fasteners passing through one or more of the pan sections and securing the support substrate to the roof of the building;

a first photovoltaic panel disposed at the inclined angle with respect to the mounting plane on the first mounting surface, wherein the first photovoltaic panel comprises a first plurality of photovoltaic cells, wherein an aspect ratio of a length of a first edge of the first photovoltaic panel to a length of a second edge of the first photovoltaic panel is greater than 10:1, wherein the support substrate is configured so that at least the second edge of the first photovoltaic panel is at an inclined angle relative to the mounting plane and at least the first edge of the first photovoltaic panel is substantially parallel to the mounting plane;

a second photovoltaic panel disposed at the inclined angle with respect to the mounting plane on the second mounting surface, wherein the second photovoltaic panel comprises a second plurality of photovoltaic cells, wherein an aspect ratio of a length of a first edge of the second photovoltaic panel to a length of a second edge of the second photovoltaic panel is greater than 10:1, wherein the support substrate is configured so that at least the second edge of the second photovoltaic panel is at an inclined angle relative to the mounting plane and at least the first edge of the second photovoltaic panel is substantially parallel to the mounting plane; and wherein:
   each support substrate of the plurality of support substrates includes an outer projecting formation lacking any photovoltaic panels and defining a lapping edge of the support substrate;
   the lapping edges of first and second adjacent support substrates of the plurality of support substrates overlap each other; and a peak of the plurality of alternating peaks of the first support substrate is nested under a peak of the plurality of alternating peaks of the second support substrate.

16. The panel system of claim 15, further comprising a screw securing the peak of the plurality of alternating peaks of the first support substrate to the nested peak of the plurality of alternating peaks of the second support substrate.

17. The panel system of claim 15, further comprising electrical wiring electrically coupling the first photovoltaic panel and the second photovoltaic pane.

* * * * *